(12) United States Patent
Ashton et al.

(10) Patent No.: US 11,279,474 B2
(45) Date of Patent: Mar. 22, 2022

(54) COMPOSITE TWIN BEAM MAIN LANDING GEAR FOR AN AIRCRAFT

(71) Applicant: CTLP, LLC, Mapleton, UT (US)

(72) Inventors: Todd H. Ashton, Fort Worth, TX (US); Easton D. Smith, Cedar Valley, UT (US); James S. Winegar, Provo, UT (US); Austin J. N. Blue, Encinitas, CA (US); Linden S. Blue, Del Mar, CA (US)

(73) Assignee: CTLP, LLC, Mapleton, UT (US)

( * ) Notice: Subject to any disclaimer, the term of this patent is extended or adjusted under 35 U.S.C. 154(b) by 347 days.

(21) Appl. No.: 16/426,357

(22) Filed: May 30, 2019

(65) Prior Publication Data

US 2020/0377202 A1 Dec. 3, 2020
US 2021/0316845 A9 Oct. 14, 2021

(51) Int. Cl.
*B64C 25/62* (2006.01)
*F16F 1/30* (2006.01)
*F16F 1/28* (2006.01)
*B64C 25/34* (2006.01)

(52) U.S. Cl.
CPC ............... *B64C 25/62* (2013.01); *F16F 1/28* (2013.01); *F16F 1/30* (2013.01); *B64C 25/34* (2013.01)

(58) Field of Classification Search
CPC ......... B64C 25/62; B64C 25/64; B64C 25/34; F16F 1/18; F16F 1/20; F16F 1/28; F16F 1/366; F16F 1/368; F16F 2224/0241; B60G 11/02; B60G 11/12; B60G 11/08; B60G 11/38; B60G 3/28; B60G 5/047
See application file for complete search history.

(56) References Cited

U.S. PATENT DOCUMENTS

| | | | | |
|---|---|---|---|---|
| 1,845,162 A | * | 2/1932 | Lundelius | B60G 11/08 267/36.1 |
| 2,319,675 A | | 5/1943 | Grinter | |
| 2,394,826 A | * | 2/1946 | Trader | B64C 25/50 244/109 |
| 2,413,737 A | | 1/1947 | Weaver | |
| 2,534,722 A | * | 12/1950 | Meiklejohn, Jr. | B60G 3/28 267/41 |
| 2,702,188 A | * | 2/1955 | Sterne | F16F 1/20 267/49 |
| 3,002,742 A | * | 10/1961 | Troy | B62D 63/08 267/38 |
| 5,158,733 A | | 10/1992 | Trimble | |

(Continued)

OTHER PUBLICATIONS

Perkins, How the McLaren Speedtail's Flexible Carbon-Fiber Ailerons Work, Popular Mechanics, Mar. 8, 2019.

*Primary Examiner* — Richard R. Green
*Assistant Examiner* — Colin Zohoori
(74) *Attorney, Agent, or Firm* — Neil Nydegger

(57) ABSTRACT

A main landing gear assembly for an aircraft has an upper beam and a lower beam. The proximal ends of the upper and lower beams are each connected to a trunnion assembly that is mounted on the fuselage or wing of the aircraft. The distal ends of the upper and lower beams are each affixed to an axle support structure on which a main wheel of the landing gear assembly is mounted. In the gear assembly, the upper beam and the lower beam are coplanar and act together, in combination, to accommodate a planar flexure of the gear assembly during aircraft takeoffs and landings.

7 Claims, 5 Drawing Sheets

(56) References Cited

U.S. PATENT DOCUMENTS

| | | |
|---|---|---|
| 6,482,497 B1 | 11/2002 | Kay |
| 6,743,504 B1 | 6/2004 | Allen |
| 6,889,937 B2 | 5/2005 | Simpson |
| 8,256,710 B2 | 9/2012 | Mason |
| 2002/0148553 A1 | 10/2002 | Campbell |
| 2002/0175487 A1* | 11/2002 | Lawson ................ B60G 7/001 280/124.135 |
| 2004/0079838 A1 | 4/2004 | Simpson |
| 2006/0249626 A1 | 11/2006 | Simpson |

* cited by examiner

COMPOSITE TWIN BEAM MAIN LANDING GEAR FOR AN AIRCRAFT

FIELD OF THE INVENTION

The present invention pertains generally to aircraft landing gears. More particularly, the present invention pertains to aircraft landing gears that are made using a composite material. The present invention is particularly, but not exclusively, useful for the manufacture of aircraft landing gears which have two (i.e. upper and lower), coplanar beams.

BACKGROUND OF THE INVENTION

The forces acting against the landing gear of an aircraft during landing can be substantial. Moreover, the rebound vibrations experienced by a landing gear during either a bounce after landing, or following takeoff, can also have detrimental effects for the aircraft. Thus, it has always been important to ensure that the landing gear of an aircraft is strong, yet flexible enough to absorb impact energy loads in order to absorb the landing forces on the aircraft. Also it is important that the landing gear be properly damped to suppress vibrations and recoil.

As the aviation industry continues to move further toward the use of light-weight materials for the manufacture of aircraft, composite materials have become increasingly interesting. Heretofore, however, the use of composite materials for landing gears have been given scant consideration. As a consequence, the total weight of a landing gear assembly, including necessary shock absorbers, can be undesirably heavy.

In light of the above, it is an object of the present invention to provide a main landing gear and/or a nose gear for an aircraft wherein the structure between the aircraft's fuselage and the main gear wheels and the nose wheel are made of a light-weight composite materials. Another object of the present invention is to provide a main landing gear and/or a nose gear for an aircraft which is made of a composite material with a structure that will both resist landing forces and suppress unwanted resultant vibrations. Still another object of the present invention is to provide an aircraft main landing gear and/or a nose gear that is (are) made of a composite material, that is easy to manufacture, is simple to use and is comparatively cost effective.

SUMMARY OF THE INVENTION

In accordance with the present invention a landing gear assembly for an aircraft includes a trunnion assembly that is mounted on the fuselage of the aircraft, and an axel support structure which supports a wheel(s) on the landing gear assembly. A flexure unit, which is made of a composite material, is engaged between the trunnion assembly and the axel support structure. Structurally, the flexure unit includes an upper beam having a length $L_{(upper)}$, and a lower beam having a length $L_{(lower)}$.

In the flexure unit, each beam has a proximal end that is mounted on the trunnion assembly. Also, each beam has a distal end that is affixed to the axel support structure. In combination with each other, the upper beam and the lower beam are coplanar to jointly establish a flexure unit. It is envisioned that the flexure unit will be vertically oriented to resist planar flexures of the gear assembly.

In detail, each beam includes a respective main leaf. It may, however, also include at least one stub leaf. In the upper beam the main leaf extends through the length $L_{(upper)}$, and in the lower beam, the main leaf extends through the length $L_{(lower)}$. Further, if incorporated, a stub leaf extends above and along the main leaf of the upper beam from the trunnion assembly through a distance that is less than $L_{(upper)}$. Similarly, if incorporated, a stub leaf extends above and along the main leaf of the lower beam from the trunnion assembly through a distance that is less than $L_{(lower)}$. Each stub leaf is positioned above its respective main leaf to create a gap between them. Additional stub leaves can be similarly added above a lower stub leaf with gaps therebetween in either the upper beam or the lower beam, as desired. In each case, an energy absorbing elastomer is made part of the structure in the gap between the stub leaf and the main leaf, and in the gaps between adjacent stub leaves, if incorporated.

For a flexure unit of the present invention, the proximal end of the upper beam, and the proximal end of the lower beam can be connected to the trunnion assembly with a distance $s_p$ between them. Also, the distal end of the upper beam and the distal end of the lower beam can be connected to the axel support structure with a distance $s_d$ between them. Typically, $s_p$ will be equal to or greater than $s_d$. Additionally, trusses can be incorporated into the flexure unit between the upper and lower beams. In detail, respective trusses can be interconnected between the beams and with the axel support structure or the trunnion assembly. Within the structure disclosed here, the overall purpose of the flexure unit is to dissipate energy and to dampen rebound vibrations during a flexure of the gear assembly.

An additional structural feature of the landing gear assembly is an upper back-up laminate that is connected to the axel support structure and positioned in contact with the upper beam. Specifically, the upper back-up laminate extends in a proximal direction from the axel support structure, and it is positioned below and in contact with the upper main leaf to support the upper main leaf during a flexure of the flexure unit. Similarly, a lower back-up laminate is also connected to the axel support structure. Like the upper back-up laminate, it extends in a proximal direction from the axel support structure. Further, it is positioned below and in contact with the lower main leaf, to support the lower main leaf during a flexure of the gear assembly.

For a manufacture of the landing gear assembly of the present invention in accordance with a first embodiment, the axel support structure is made of a composite material that is integrated with composite structures of the upper beam and the lower beam. These components are then co-cured to create a monolithic unitary structure for the landing gear.

For a second embodiment of the present invention, the axel support structure includes an outboard plate, an upper inboard plate, and a lower inboard plate that are bonded with the upper beam and the lower beam. Note: for purposes of this disclosure, the term "outbound" means farthest from the fuselage, and the term "inbound" means closest to the aircraft fuselage. In detail, the upper main leaf and the upper back-up laminate of the flexure unit are co-cured or bonded, together with the axel support structure, between the outboard plate and the upper inboard plate. Further, the lower main leaf and the lower back-up laminate are co-cured or bonded together between the outboard plate and the lower inboard plate. For this second embodiment, the axel support structure, the upper beam and the lower beam can all be made of a same composite material prior to being respectively co-cured or bonded with the upper beam and the lower beam.

Also, for the manufacture of the landing gear assembly, the trunnion assembly includes a trunnion body which has a threaded upper end and a threaded lower end. A threaded upper trunnion nut is engaged with the threaded upper end of the trunnion body to hold the upper beam and any upper stub leaves there may be, between the upper trunnion nut and the trunnion body. Similarly, a threaded lower trunnion nut is engaged with the threaded lower end of the trunnion body to hold the lower beam and any lower stub leaves, together with a drag link, between the lower trunnion nut and the trunnion body.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference character's refer to similar parts, and in which.

DESCRIPTION OF THE PREFERRED EMBODIMENTS

Figure 1:
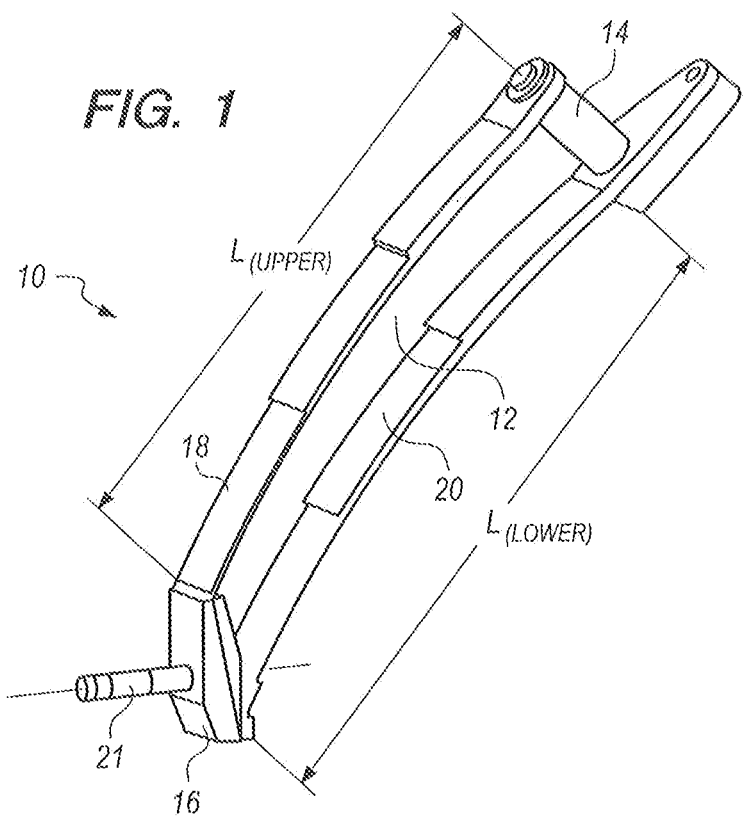
FIG. 1 is a perspective view of a composite twin beam main landing gear assembly for an aircraft in accordance with the present invention.

Referring initially to FIG. 1 a composite twin beam main landing gear assembly for an aircraft in accordance with the present invention is shown, and is generally designated 10. As shown the gear assembly 10 includes a flexure unit 12, which is made of a composite material and which extends between a trunnion assembly 14 and an axel support structure 16. Further, it is seen that the flexure unit 12 includes an upper beam 18 having a length $L_{(upper)}$, and a lower beam 20 having a length $L_{(lower)}$. In combination, the upper beam 18 and the lower beam 20 are coplanar and, in use, will generally be in a vertical plane. As intended for the present invention, the trunnion assembly 14 will be attached to the fuselage or to a wing of an aircraft (not shown), and the axel support structure 16 will support at least one landing wheel (not shown), which is mounted on axel 21.

An important aspect of the present invention is the fact that the essential components of the flexure unit 12 are made of a composite material which incorporates carbon fibers and a compound of epoxy or other resins. In detail, these components are manufactured using cure tools, such as the mandrel type cure tool 22a shown in FIG. 2A and the cure tool 22b shown in FIG. 2B. As shown, both cure tool 22a and cure tool 22b are formed with an undulating and cuspidate surface. In FIG. 2B the cure tool 22b is shown with a centerline 24 that defines the surface.

Figure 2A:
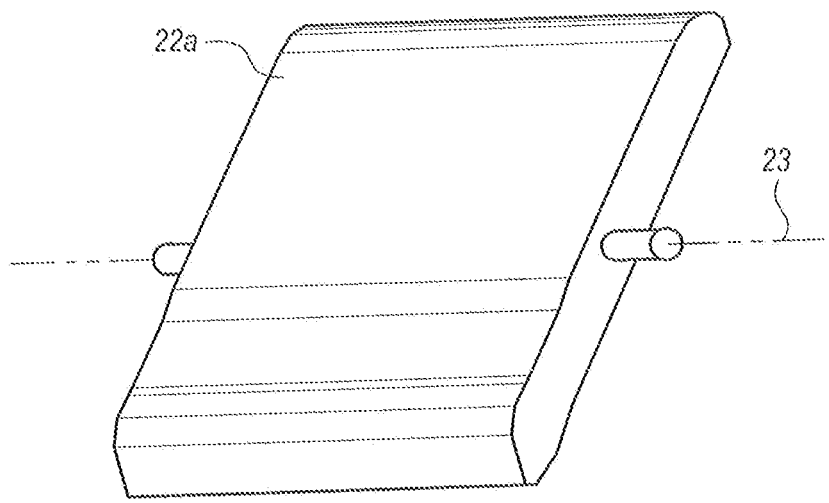
FIG. 2A is a perspective view of a cure tool which is useful for manufacturing a flexure unit as a unitary structure.
Figure 2B:
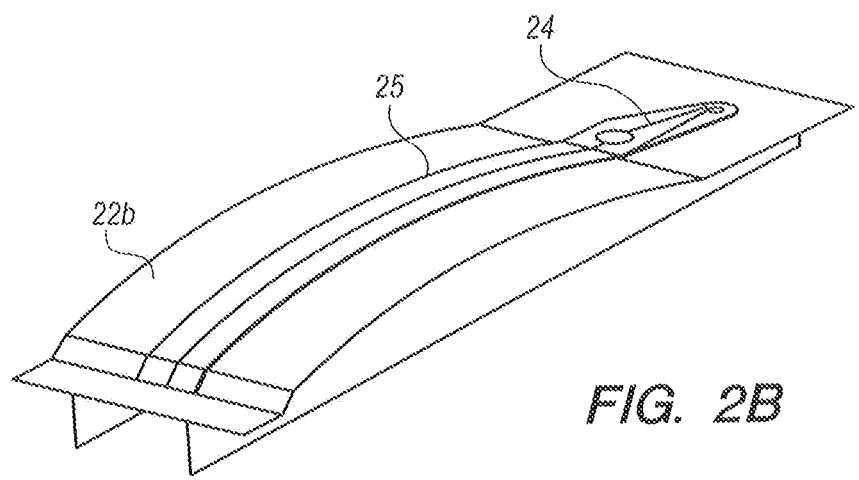
FIG. 2B is a perspective view of a cure tool which is useful for manufacturing the leaves, and specified portions thereof, for a beam in the flexure unit of the landing gear assembly.

In FIG. 2A, a mandrel type cure tool 22a is shown which can be used to manufacture a flexure unit 12 in accordance with the present invention as a unitary structure. In detail, the cure tool 22a is designed with undulating and cuspidate surfaces that conform with the desired structural components for an upper beam 18, and for a lower beam 20 of the flexure unit 12. Thus, with a rotation of the cure tool 22a around the axis 23 of the cure tool 22a, the composite material for the desired unitary flexure unit 12 can be applied onto the cure tool 22a, prior to being cured.

The present invention also envisions the use of a substrate type cure tool 22b as shown in FIG. 2B. When using the cure tool 22b, a strip of composite material having a predetermined width and a predetermined thickness can be laid along its centerline 24 and subsequently cured in accordance with techniques well known in the pertinent art. The result here is the creation of a laminate element 25. In particular, FIG. 2B shows a cure tool 22b being used for the manufacture of a laminate element 25 that will eventually become an upper main leaf 26 (see FIG. 3). It is to be understood, however, that the same cure tool 22b can be used to manufacture other laminate elements 25 having shorter lengths measured along selected portions of the centerline 24. Moreover, a similar cure tool 22b' (not shown), which is symmetrical to the cure tool 22b, can be used for the manufacture of a flexure unit 12b' (not shown) which will be used on the side of an aircraft opposite the side on which the flexure unit 12 is to be used.

Figure 3:
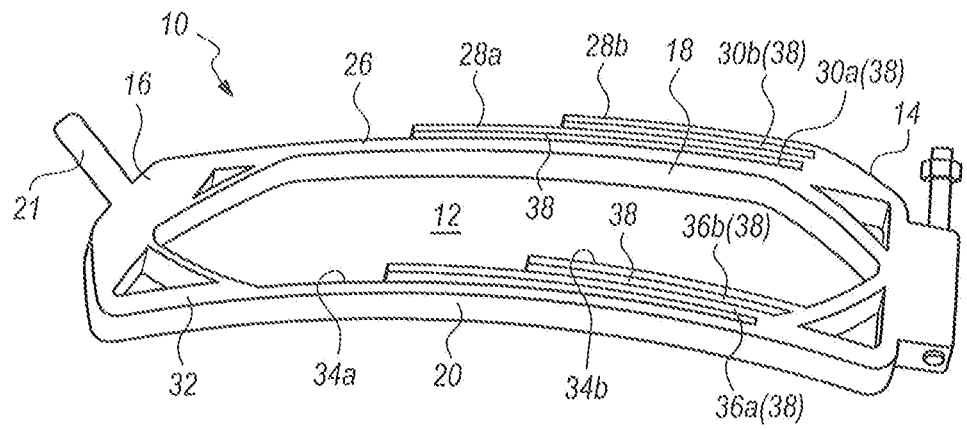
FIG. 3 is a side elevation view of the composite twin beam main landing gear assembly.

Referring now to FIG. 3, the structure for the upper beam 18 is shown to include the upper main leaf 26. Additionally, the upper beam 18 includes an upper stub leaf 28a and an upper stub leaf 28b which are positioned sequentially above the main leaf 26. In this combination, the upper stub leaves 28a and 28b extend parallel along the upper main leaf 26 in a distal direction from the trunnion assembly 14. As also shown in FIG. 3, a gap 30a is created between the main leaf 26 and the stub leaf 28a. Also, a gap 30b is created between the stub leaf 28a and the stub leaf 28b.

Structurally similar to the upper beam 18, the lower beam 20 of flexure unit 12 includes a lower main leaf 32. Further, a lower stub leaf 34a and a lower stub leaf 34b are positioned sequentially above the lower main leaf 32. In this combination, the lower stub leaves 34a and 34b extend parallel along the lower main leaf 32 in a distal direction from the trunnion assembly 14. As also shown in FIG. 3, a gap 36a is created between the main leaf 32 and the stub leaf 34a. Additionally, a gap 36b is created between the stub leaf 34a and the stub leaf 34b.

As intended for the present invention, interleaves 38, which are made of a gum rubber, are used to fill the respective gaps 30a and 30b of the upper main leaf 26, and the gaps 36a and 36b of the lower main leaf 32. Preferably, gum rubber for the interleaves 38 will be an energy-absorbing elastomer, such as Airdam 1, Sorbothane, or AN-VI rubber.

Figure 4:
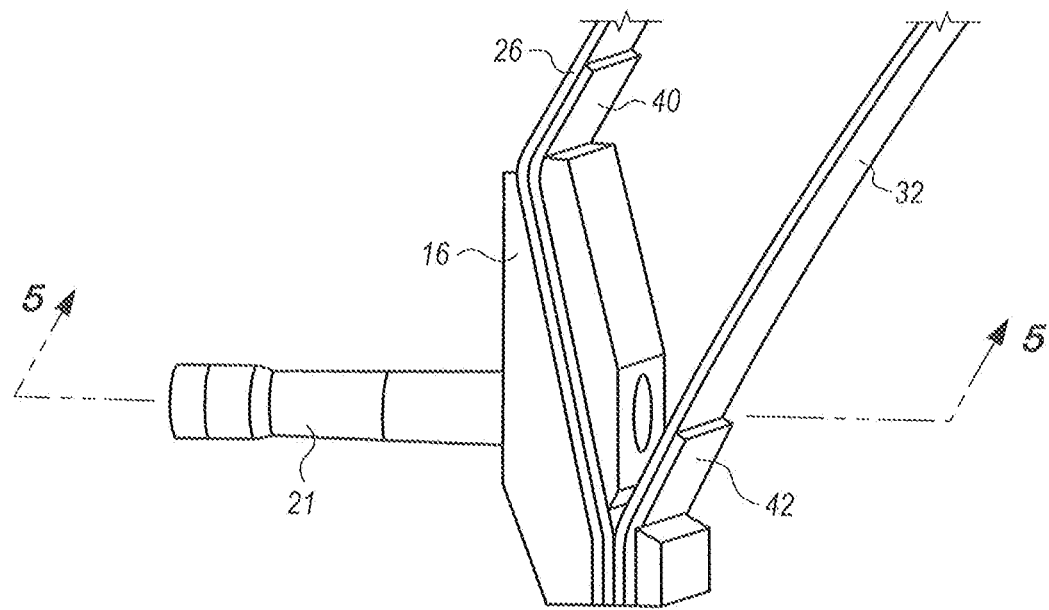
FIG. 4 is a perspective view of an axel support structure used in the landing gear assembly for supporting an aircraft wheel, and for establishing an engagement with the distal ends of the upper and lower beams in the flexure unit of the present invention.

With reference to FIG. 4 it will be seen that the flexure unit 12 includes an upper back-up laminate 40 that is mounted on the axel support structure 16. As shown, the upper back-up laminate 40 extends in a proximal direction from the axel support structure 16, below the upper main leaf 26. Further, it is shown that the back-up laminate 40 is in contact with the upper main leaf 26 to support the upper main leaf 26 during a flexure of the gear assembly 10. Also, a lower back-up laminate 42 is mounted on the axel support structure 16 to extend in a proximal direction therefrom below the lower main leaf 32. As shown, the lower back-up laminate 42 is in contact with the lower main leaf 32 to support the lower main leaf 32 during a flexure of the gear assembly 10.

Figure 5:
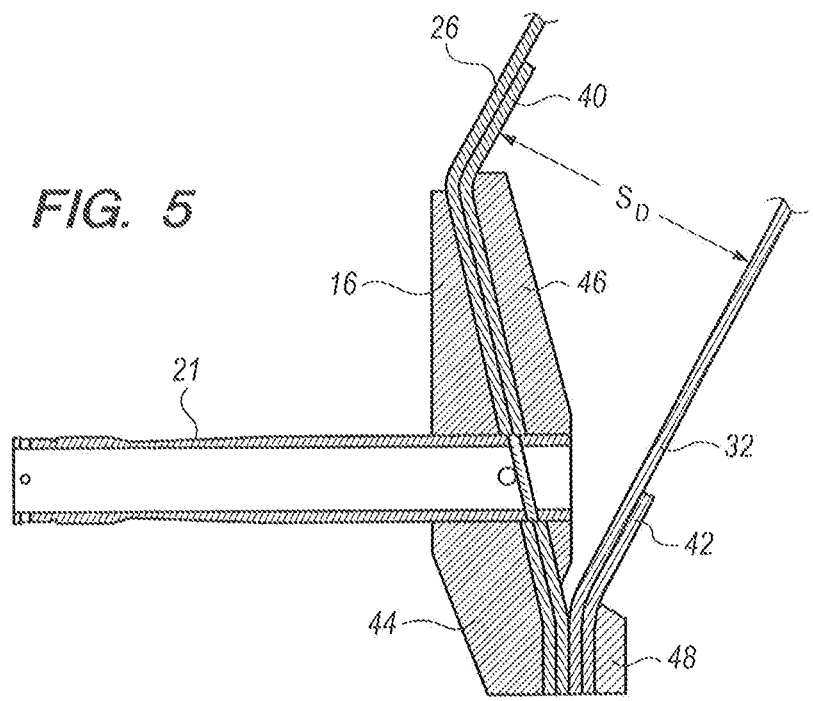
FIG. 5 is a cross section view of the axel support structure as seen along the line 5-5 in FIG. 4.

The connection between a flexure unit 12 and the axel support structure 16 will be best appreciated with reference to FIG. 5. There it is to be appreciated that a complete cured assembly for the axel support structure 16 is shown. As shown, the axel support structure 16 includes an outboard plate 44, an upper inboard plate 46, and a lower inboard plate 48. As shown, the upper main leaf 26 and the upper back-up laminate 40 are co-cured, bonded or held together between the outboard plate 44 and the upper inboard plate 46. On the other hand, the lower main leaf 32 and the lower back-up laminate 42 are co-cured, bonded or held together between the outboard plate 44 and the lower inboard plate 48. For an alternate embodiment of the axel support structure 16, wherein the flexure unit 12 is manufactured as a unitary structure, the upper back-up laminate 40 and the lower back-up laminate 42 can be incorporated into the composite material used to manufacture the axel support structure 16.

Figure 6:
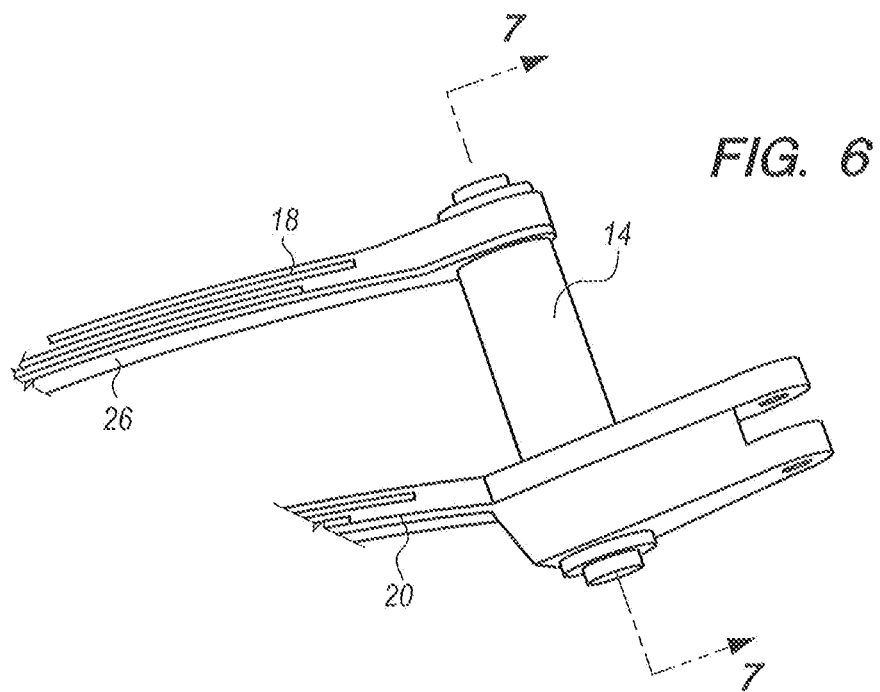
FIG. 6 is a perspective view of a trunnion assembly for establishing an engagement with the proximal ends of upper and lower beams in the flexure unit of the present invention.
Figure 7:
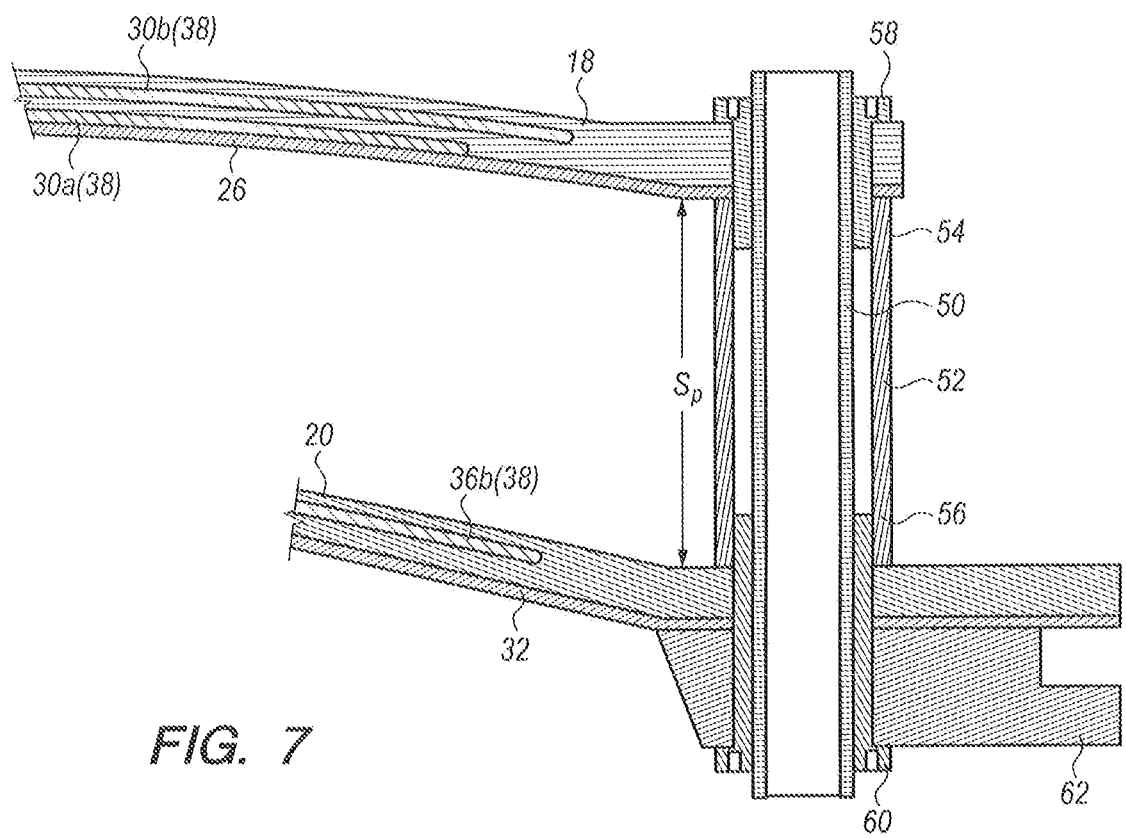
FIG. 7 is a cross section view of the trunnion assembly as seen along the line 7-7 in FIG. 6.

In FIG. 6 it will be seen that the trunnion assembly 14 is connected with the respective proximal ends of the upper beam 18 and the lower beam 20. The interconnection of these components will be best appreciated with reference to FIG. 7. For this purpose, it will be seen that the trunnion assembly 14 includes a trunnion pin 50 which is surrounded by a trunnion body 52 having a threaded upper end 54 and a threaded lower end 56. In FIG. 7, a threaded upper trunnion nut 58 is shown engaged with the threaded upper end of the trunnion body 52. And, it is also seen that a threaded lower trunnion nut 60 is engaged with the threaded lower end of the trunnion body 52.

In order to engage the upper beam 18 with the trunnion assembly 14, the laminate elements 25 that are included in the upper beam 18 (i.e. the upper main leaf 26, and the stub leaves 28a and 28b) are positioned between the upper trunnion nut 58 and the upper end 54 of the trunnion body 52. The upper trunnion nut 58 is then threaded onto the trunnion body 52 to hold the upper main leaf 26 and the upper stub leaves 28a and 28b between the upper trunnion nut 58 and the trunnion body 52. Likewise, the lower trunnion nut 60 is threaded onto the lower end 56 of the trunnion body 52 to hold the lower main leaf 32, the lower stub leaves 34a and 34b and a drag link 62 between the lower trunnion nut 60 and the trunnion body 52. Preferably, when used, the outboard plate 44, the upper inboard plate 46, the lower inboard plate 48, the trunnion pin 50, the trunnion body 52, the upper trunnion nut 58 and the lower trunnion nut 60 are all made of a material selected from the group consisting of stainless steel, aluminum and titanium.

For an assembly of the main landing gear, the proximal end of the upper composite leaf spring (i.e. upper beam 18), and the proximal end of the lower composite leaf spring (i.e. lower beam 20), are mounted on the trunnion assembly 14 with a distance $s_p$ between them. Also, the distal end of the upper composite leaf spring (i.e. upper beam 18) and the distal end of the lower composite leaf spring (i.e. lower beam 20) are mounted on a axel support structure 16 with a distance $s_d$ between them. In this combination, $s_p$ and $s_d$ are equal to, or substantially equal to, each other. In any event, a coplanar relationship is established between the upper beam 18 and the lower beam 20.

Although the above disclosure has been focused primarily on a main landing gear assembly, the present invention also envisions its use for the manufacture of a nose gear assembly. In the case of a nose gear assembly, however, it is most likely that, rather than creating a flexure unit 12, only one beam (e.g. a composite leaf spring) would be used. Further, although the above disclosure has also focused on retractable gear assemblies, it is to be appreciated that with minimal modifications the present invention can be just as well used for the manufacture of fixed gear assemblies.

While the particular Composite Twin Beam Main Landing Gear for an Aircraft as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A landing gear assembly for an aircraft which comprises:

an axel support structure;

a trunnion assembly mounted on the aircraft;

an upper beam made of a composite material, having a length $L_{(upper)}$, and extending between the trunnion assembly on the aircraft and the axel support structure wherein the upper beam includes a main leaf extending through the length $L_{(upper)}$ and at least one stub leaf having a length less than $L_{(upper)}$ positioned above the main leaf and extending from the trunnion assembly with a gap created therebetween, with an energy absorbing elastomer infused into the gap between the stub leaf and the main leaf of the upper beam;

a lower beam made of a composite material, having a length $L_{(lower)}$ extending between the trunnion assembly on the aircraft and the axel support structure, wherein the lower beam is coplanar with the upper beam to create a flexure unit to dissipate energy and to dampen rebound vibrations during a flexure of the gear assembly and wherein the lower beam includes a main leaf extending through the length $L_{(lower)}$ and at least one stub leaf having a length less than $L_{(lower)}$ positioned above the main leaf and extending from the trunnion assembly with a gap created therebetween, with an energy absorbing elastomer infused into the gap between the stub leaf and the main leaf of the lower beam;

an upper back-up laminate mounted on the axel support structure to extend in a proximal direction therefrom below the upper main leaf and in contact therewith and wherein the upper main leaf and the upper back-up laminate are bonded together between an outboard plate and the upper inboard plate to support the upper main leaf during a flexure of the flexure unit; and a lower back-up laminate mounted on the axel support structure to extend in a proximal direction therefrom below the lower main leaf and in contact therewith and wherein the lower main leaf and the lower back-up laminate are bonded together between the outboard plate and a lower inboard plate to support the lower main leaf during a flexure of the flexure unit.

2. The landing gear assembly recited in claim 1 wherein the upper beam and the lower beam are connected to the trunnion assembly and the trunnion assembly comprises:
  a trunnion pin;
  a trunnion body having a threaded upper end and a threaded lower end, wherein the trunnion body is positioned around the trunnion pin;
  a threaded upper trunnion nut engaged with the threaded upper end of the trunnion body for movement thereon to hold the upper main leaf and the upper stub leaves therebetween; and
  a threaded lower trunnion nut engaged with the threaded lower end of the trunnion body for movement thereon to hold the lower main leaf, the lower stub leaves and a drag link therebetween.

3. The landing gear assembly recited in claim 1 wherein the outboard plate, the upper inboard plate, the lower inboard plate, the trunnion pin, the trunnion body, the upper trunnion nut and the lower trunnion nut are made of a material selected from the group consisting of stainless steel, aluminum and titanium.

4. The landing gear assembly recited in claim 1 wherein the upper beam, the lower beam and the axel support structure are made of a composite material and are laminated and co-cured together to form a unitary structure.

5. The landing gear assembly recited in claim 1 wherein the elastomer filling the gap is an energy-absorbing elastomer selected from the group consisting of Airdam 1, Sorbothane, AN-VI rubber and a hi-temp gum rubber.

6. A landing gear assembly for an aircraft which comprises:
  an axel support structure for holding a wheel thereon;
  a trunnion assembly mounted on the aircraft;
  a leaf spring made of a composite material wherein the composite leaf spring is an upper beam and has a length $L_{(upper)}$ with a proximal end mounted on the trunnion assembly and a distal end affixed to the axel support structure;
  a lower beam having a length $L_{(lower)}$ with a proximal end mounted on the trunnion assembly and a distal end affixed to the axel support structure, wherein the upper beam includes an upper main leaf extending through the length $L_{(upper)}$ and at least one stub leaf having a length less than $L_{(upper)}$ positioned above the upper main leaf and extending from the trunnion assembly with a gap created therebetween, and further wherein the lower beam is a composite leaf spring and includes a lower main leaf extending through the length $L_{(lower)}$ and at least one stub leaf having a length less than $L_{(lower)}$ positioned above the lower main leaf and extending from the trunnion assembly with a gap created therebetween, and an energy absorbing elastomer is infused into the respective gaps between the stub leaf and the upper main leaf of the upper beam and between the stub leaf and the lower main leaf of the lower beam to dissipate energy and to dampen rebound vibrations during a flexure of the gear assembly, and wherein the upper beam and the lower beam are coplanar to create a flexure unit to dissipate energy during a planar flexure of the gear assembly;
  an upper back-up laminate mounted on the axel support structure to extend in a proximal direction therefrom below the upper main leaf and in contact therewith to support the upper main leaf during a flexure of the gear assembly;
  a lower back-up laminate mounted on the axel support structure to extend in a proximal direction therefrom below the lower main leaf and in contact therewith to support the lower main leaf during a flexure of the gear assembly;
  an outboard plate;
  an upper inboard plate, wherein the upper beam and the upper back-up laminate are bonded together and held between the outboard plate and the upper inboard plate; and
  a lower inboard plate, wherein the lower beam and the lower back-up laminate are bonded together and held between the outboard plate and the lower inboard plate.

7. The landing gear assembly recited in claim 6 wherein the trunnion assembly comprises:
  a trunnion pin;
  a trunnion body having a threaded upper end and a threaded lower end, wherein the trunnion body is positioned around the trunnion pin;
  a threaded upper trunnion nut engaged with the threaded upper end of the trunnion body for movement thereon to hold the upper main leaf and the upper stub leaves therebetween; and
  a threaded lower trunnion nut engaged with the threaded lower end of the trunnion body for movement thereon to hold the lower main leaf, the lower stub leaves and a drag link therebetween.

* * * * *